(12) United States Patent
Prottengeier et al.

(10) Patent No.: US 8,858,139 B2
(45) Date of Patent: Oct. 14, 2014

(54) RETAINER DEVICE FOR VEHICLE CARGO SPACE

(75) Inventors: Gregg R. Prottengeier, Plymouth, MI (US); Rolland Vortriede, Grosse Pointe Park, MI (US); James W. Finck, Clarkston, MI (US); Dahlia Dallo, West Bloomfield, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 4 days.

(21) Appl. No.: 13/369,444

(22) Filed: Feb. 9, 2012

(65) Prior Publication Data

US 2013/0209191 A1 Aug. 15, 2013

(51) Int. Cl.
*B61D 45/00* (2006.01)
*B60P 7/08* (2006.01)

(52) U.S. Cl.
USPC .......................................................... 410/121

(58) Field of Classification Search
USPC ......... 410/121, 31, 77; 296/37.1, 37.5, 37.16; 224/42.33, 42.34, 545, 548, 549, 224/553–556, 567, 281, 282, 925; 248/95
See application file for complete search history.

(56) References Cited

U.S. PATENT DOCUMENTS

| | | | |
|---|---|---|---|
| 942,231 A * | 12/1909 | Woodman | 248/97 |
| 2,554,776 A * | 5/1951 | Comeau | 224/496 |
| 2,898,146 A * | 8/1959 | Yudenfreund | 296/39.1 |
| 3,986,649 A * | 10/1976 | Heimstra | 224/567 |
| 4,226,348 A | 10/1980 | Dottor et al. | |
| 4,372,512 A * | 2/1983 | Wolfe | 248/97 |
| 4,540,213 A | 9/1985 | Herlitz et al. | |
| 4,998,694 A * | 3/1991 | Barteaux | 248/100 |
| 5,094,375 A * | 3/1992 | Wright | 224/404 |
| 5,137,158 A * | 8/1992 | Brockway | 211/106.01 |
| 5,161,700 A * | 11/1992 | Stannis et al. | 211/175 |
| 5,234,116 A * | 8/1993 | Kristinsson et al. | 211/201 |
| 5,287,971 A | 2/1994 | Dorman | |
| 5,340,183 A * | 8/1994 | Horian | 296/24.4 |
| 5,366,189 A * | 11/1994 | Thompson | 248/97 |
| D353,291 S * | 12/1994 | Mercer | D6/513 |
| 5,464,102 A * | 11/1995 | LeBlanc et al. | 211/12 |
| 5,484,091 A * | 1/1996 | Malinowski et al. | 224/542 |
| 5,526,972 A * | 6/1996 | Frazier et al. | 224/539 |
| 5,845,951 A * | 12/1998 | Webb | 294/159 |
| 6,053,553 A * | 4/2000 | Hespelt | 296/37.1 |
| 6,062,452 A | 5/2000 | Kauskey | |
| 6,092,704 A | 7/2000 | Baumeister | |
| 6,120,076 A * | 9/2000 | Adsit et al. | 296/26.11 |
| 6,367,746 B1 * | 4/2002 | Webb et al. | 248/95 |
| 6,502,731 B1 | 1/2003 | Gehring et al. | |
| 6,669,067 B2 * | 12/2003 | Schuster | 224/543 |
| 6,676,185 B2 * | 1/2004 | Gehring et al. | 296/37.5 |
| 6,811,196 B2 * | 11/2004 | Gammon | 296/37.1 |
| 6,908,269 B1 | 6/2005 | Youngs et al. | |

(Continued)

*Primary Examiner* — H Gutman
(74) *Attorney, Agent, or Firm* — Ralph E Smith

(57) ABSTRACT

A retainer device retains an object within a cargo area of a vehicle. The cargo area is defined at least partially by a cargo area floor, a rear panel that extends upright from the cargo area floor, and a plurality of side panels that extend upright from the cargo area floor and that are disposed at respective sides of the rear panel. The retainer device includes a retaining member operable for retaining the object thereto. The retainer device also includes a coupling member that moveably couples the retaining member to an interior surface of the rear panel. The retaining member is movable between a stowed position and a deployed position.

15 Claims, 3 Drawing Sheets

(56) References Cited

U.S. PATENT DOCUMENTS

| | | | |
|---|---|---|---|
| 6,986,541 B1* | 1/2006 | Haack | 296/39.2 |
| 7,243,825 B2 | 7/2007 | Weisenfeld | |
| 7,488,021 B1* | 2/2009 | Roos et al. | 296/26.11 |
| 7,644,972 B2* | 1/2010 | Lim | 296/37.1 |
| 7,798,752 B2* | 9/2010 | Harrison | 410/35 |
| 7,866,926 B2* | 1/2011 | Lim | 410/94 |
| 8,057,141 B2* | 11/2011 | Bernhardsson et al. | 410/94 |
| 8,075,037 B2* | 12/2011 | Mahaffy | 296/37.6 |
| 2001/0046425 A1 | 11/2001 | Vagnino | |
| 2003/0129038 A1* | 7/2003 | Addy | 410/97 |
| 2007/0154276 A1* | 7/2007 | Dollar | 410/121 |
| 2011/0074175 A1* | 3/2011 | Mahaffy | 296/37.6 |
| 2011/0293385 A1* | 12/2011 | Stahl et al. | 410/44 |

* cited by examiner

RETAINER DEVICE FOR VEHICLE CARGO SPACE

FIELD

The present disclosure relates to a retainer device and, more particularly, to a retainer device for a vehicle cargo space.

BACKGROUND

Vehicles often include a designated cargo space (i.e., trunk or boot). Objects, such as grocery bags, can be stored within the cargo space to be transported by the vehicle. However, the objects within the cargo space may not be adequately retained, and the objects can inadvertently and undesirably move or spill within the cargo space.

SUMMARY

A retainer device for retaining an object within a cargo area of a vehicle is disclosed. The cargo area is defined at least partially by a cargo area floor, a rear panel that extends upright from the cargo area floor, and a plurality of side panels that extend upright from the cargo area floor and that are disposed at respective sides of the rear panel. The retainer device includes a retaining member operable for retaining the object thereto. The retainer device also includes a coupling member that moveably couples the retaining member to an interior surface of the rear panel. The retaining member is movable between a stowed position and a deployed position.

A vehicle is also disclosed. The vehicle includes a vehicle body having a cargo area. The body includes a cargo area floor, a rear panel that extends upright from the cargo area floor, and a plurality of side panels that extend upright from the cargo area floor and that are disposed at respective sides of the rear panel. The cargo area floor, the rear panel, and the plurality of side panels collectively define the cargo area at least partially. The vehicle also includes a retainer device that includes a retaining member and a coupling member. The coupling member moveably couples the retaining member to an interior surface of the rear panel. The retaining member is moveable between a stowed position and a deployed position. The retaining member is operable for retaining an object thereto.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

DETAILED DESCRIPTION

Figure 1:
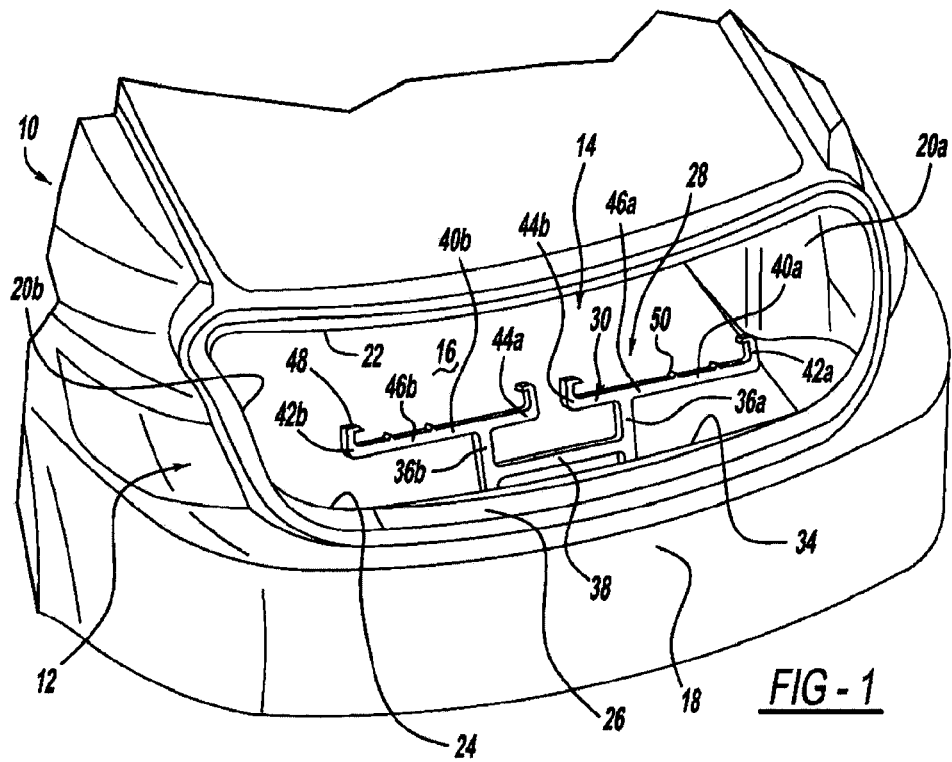
FIG. 1 is a rear perspective view of a vehicle with a retainer device according to teachings of the present disclosure.

Referring initially to FIG. 1, a vehicle 10 is illustrated according to teachings of the present disclosure. The vehicle 10 includes a vehicle body 12 that defines a cargo area 14 (i.e., trunk space or boot). Specifically, the vehicle body 12 can include a cargo area floor 16 that extends generally horizontally, a rear panel 18 that extends upright from the cargo area floor 16, and a plurality of side panels 20a, 20b that also extend upright from the cargo area floor 16. Each side panel 20a, 20b can be disposed at a respective side or end of the rear panel 18. The vehicle body 12 can additionally include a deck 22 that extends horizontally (e.g., substantially parallel to the floor 16) and that is spaced apart from the cargo area floor 16. Thus, it will be appreciated that the floor 16, rear panel 18, side panels 20a, 20b, and deck 22 can collectively define the cargo area 14 at least partially.

Furthermore, the body 12 can include a cargo area opening 24 that provides access to the cargo area 14. The opening 24 can be defined at least partially by a lip 26 that extends continuously from the upper edges of the rear panel 18, along the side panels 20a, 20b, and along a rear edge of the deck 22. The vehicle body 12 can further include a deck lid 27 (FIG. 3) or trunk cover that can selectively cover and uncover the opening 24. For instance, the deck lid 27 can be pivotally attached (e.g., hingeably attached) adjacent the deck 22.

It will be appreciated that the vehicle 10 can be a sedan-type vehicle 10. However, it will be appreciated that the vehicle 10 could be a hatchback or other type of vehicle without departing from the scope of the present disclosure.

Figure 2:
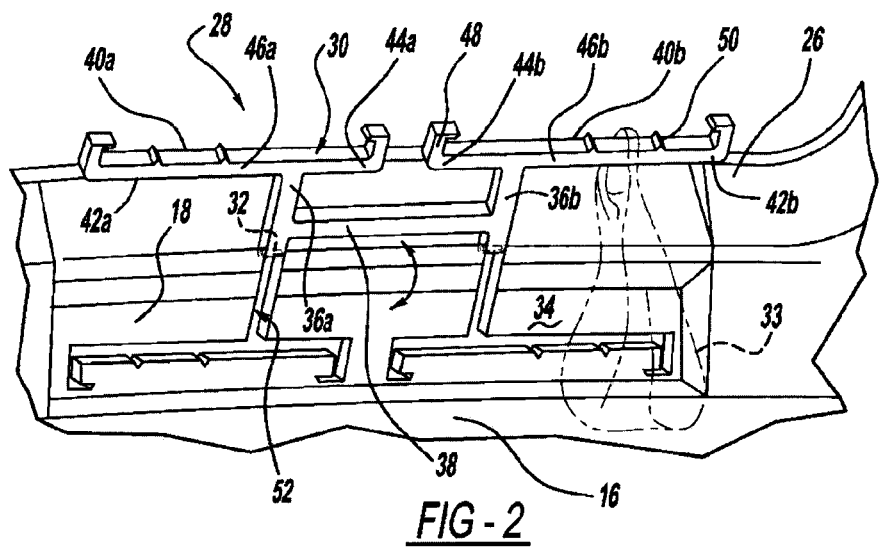
FIG. 2 is an interior, rearward perspective view of the retainer device of FIG. 1.

As shown in FIGS. 1 and 2, the vehicle 10 can also include a retainer device 28 useful for retaining objects 33 (FIG. 2) within the cargo area 14. Generally, the retainer device 28 can include a retaining member 30 and a coupling member 32. As will be discussed, the retaining member 30 can be operable for retaining one or more objects 33 (e.g., plastic or otherwise flexible grocery bags, etc.) thereto. Also, as will be discussed, the coupling member 32 can moveably couple the retaining member 30 to an interior surface 34 of the rear panel 18 (i.e., the so-called "rear waterfall panel"). As such, the retaining member 30 can move between a stowed position (position A in FIG. 3) and one or more deployed positions (positions B1 and B2 in FIG. 3). Thus, the retaining member 30 can be deployed conveniently to thereby retain one or more objects 33 within the cargo area 14 such that the objects 33 are secured therein. For instance, the object 33 can be a bag with handles, and the handles can be hung over the retaining member 30 to keep the bag from inadvertently falling over and falling open. Also, the retaining member 30 can be selectively stowed in a compact manner such that the retaining member 30 is unlikely to obstruct the cargo area 14 when not in use. Furthermore, it will be appreciated that because the retainer device 28 is attached to the rear panel 18, the retainer device 28 can be very accessible and useful as will be discussed in greater detail below.

Figure 3:
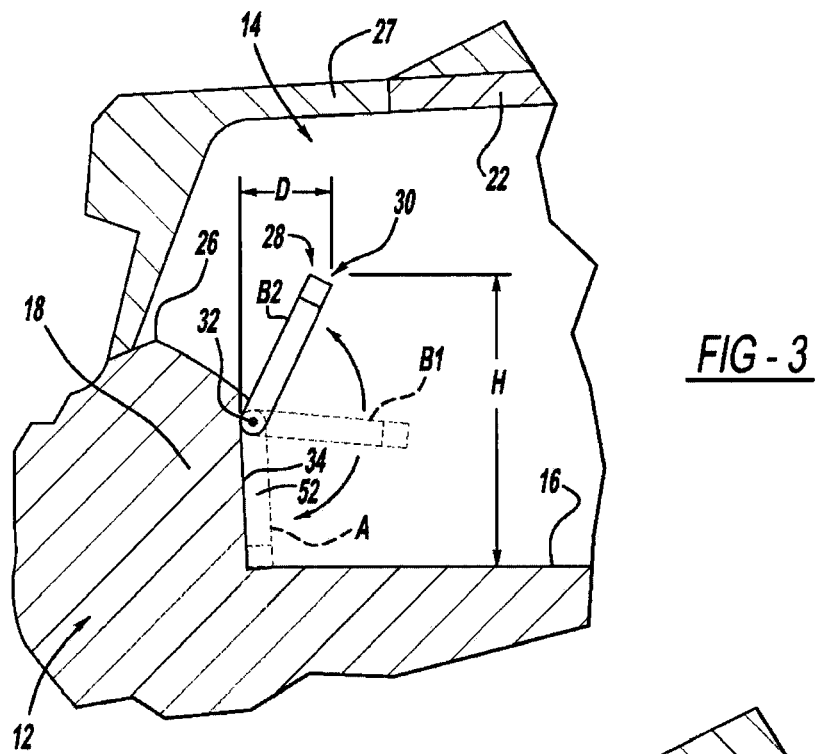
FIG. 3 is a side view of the retainer device of FIG. 1.

Referring now to FIGS. 1-3, the retaining member 30 will be discussed in greater detail. The retaining member 30 can have any suitable shape. The retaining member 30 can be monolithic with a plurality of integrally connected or fixed portions. The retaining member 30 can be made out of any suitable material, such as substantially rigid polymeric or metallic material.

As shown in the embodiments illustrated in FIGS. 1-3, the retaining member 30 can include a plurality of legs 36a, 36b that are elongate and longitudinally straight. The legs 36a, 36b can be substantially parallel to each other and can be spaced apart horizontally in a cross-vehicle direction. An elongate, straight cross bar 38 can extend between and can be fixed at each end to the legs 36a, 36b. Moreover, the retaining member 30 can include a plurality of branches 40a, 40b. The branches 40a, 40b can be elongate and can extend horizontally in a cross-vehicle direction. The branches 40a, 40b can each include an exterior end 42a, 42b, an interior end 44a, 44b, and a midsection 46a, 46b. The midsection 46a, 46b of the branches 40a, 40b can be fixed to the legs 36a, 36b, respectively. Also, the retaining member 30 can be substantially symmetrical about an imaginary line of symmetry that extends upward, away from the cargo floor 16, and that bisects the cross bar 38. Furthermore, the retaining member 30 can span across the majority of the width of the cargo area opening 24.

The retaining member 30 can further include one or more hooks 48 and raised areas 50. In the embodiments illustrated, the branches 40a, 40b can include hooks 48 at each end 42a, 42b, 44a, 44b. The hooks 48 can be turned inward toward each other such that any objects 33 hanging from the branch 40a, 40b can be retained thereon buy the hooks 48. Also, in the embodiments shown, the raised areas 50 can be small, triangular bumps that are arranged in pairs on each midsection 46a, 46b of the branches 40a, 40b. Thus, the raised areas 50 can limit movement of objects 33 (e.g., straps or handles of grocery bags) along the respective branch 40a, 40b.

As stated, the retaining member 30 can have any suitable shape and any suitable features. Also, the retaining member 30 can include additional features for further retaining objects 33 thereto. For instance, the retaining member 30 can include straps (e.g., resiliently flexible and extendable straps such as bungee cords) that attach to the legs 36a, 36b, the cross bar 38 and/or the branches 40a, 40b such that objects 33 can be strapped to the retaining member 30. It will also be appreciated that the retainer device 28 can include a plurality of independently deployable retaining members 30 without departing from the scope of the present disclosure.

Referring now to FIGS. 2 and 3, the coupling member 32 will be discussed in greater detail. The coupling member 32 can moveably couple the retaining member 30 to the rear panel 18 in any suitable fashion. For instance, the coupling member 32 can pivotally couple the retaining member 30. Specifically, the coupling member 32 can be a hinge that rotates about a single, fixed axis. (In the embodiments shown, pins extend through holes in the bottom ends of the legs 36a, 36b to hingeably couple the retaining member 30 to the rear panel 18.) In other embodiments, the coupling member 32 can be a ball-and-socket joint to allow rotation about multiple axes. In other embodiments, the coupling member 32 can slideably or otherwise couple the retaining member 30 for linear movement relative to the rear panel 18.

The coupling member 32 can allow for movement of the retaining member 30 in any suitable direction. For instance, in the embodiments illustrated in FIG. 3, the retaining member 30 can pivot (i.e., flip) upward and away from the cargo area floor 16 when moving from its stowed position (position A) to its deployed position(s) (positions B1 and B2). As shown, the coupling member 32 can allow the retaining member 30 to move between a plurality of different deployed positions (positions B1 and B2). Specifically, the user can manually pull and rotate the retaining member 30 away from its stowed position (A) to its first deployed position (B1), where the retaining member 30 is substantially horizontal and pointing toward the front of the vehicle. If the user so chooses, the retaining member 30 can be further rotated upward toward its second deployed position (B2), where the retaining member 30 is more vertically oriented and projects above the lip 26 of the rear panel 18 at a distance of H and projects inboard (i.e., forward) of the interior surface 34 at a distance of D. In this position B2, the retaining member 30 can be very accessible and yet the retaining member 30 is unlikely to interfere with closure of the deck lid 27.

The coupling member 32 can additionally include retainers, such as detents or pins (not specifically shown), for retaining the retaining member 30 in the stowed position (A) and/or in the deployed positions (B1, B2). It will also be appreciated that the retaining member 30 can remain fixed relative to the rear panel 18 to retain the objects 33 in both deployed positions (B1, B2).

Furthermore, as shown in FIGS. 2 and 3, the interior surface 34 of the rear panel 18 can include a recess 52 having a shape that corresponds to the retaining member 30. The recess 52 can receive the retaining member 30 when the retaining member 30 is rotated downward into its stowed position (A). Thus, the retainer device 28 can be stowed compactly when not in use.

Thus, the retainer device 28 can securely retain objects 33 within the cargo area 14 of the vehicle 10. Also, the location of the retainer device 28 adjacent the rear panel 18 provides additional advantages. For instance, the retainer device 28 can be almost immediately adjacent the user when the user places objects 33 within the cargo area 14 or retrieves objects 33 from the cargo area 14. Thus, the user will likely not have to bend over or search for the retainer device 28 when it is needed. Considering the user may have a heavy load of groceries or other objects 33 in hand, this aspect of the retainer device 28 can be especially helpful. Moreover, if elongate objects (e.g., skis, lumber, etc.) are to be transported within the cargo area 14, such an object 33 can be partially supported on the retaining member 30 (e.g., on the cross bar 38). Even if the deck lid 27 is open, the objects 33 can be supported on and retained on the cross bar 38 instead of the lip 26 of the vehicle body 12. Thus, the objects 33 are unlikely to scuff or otherwise damage the vehicle body 12.

Figure 4:
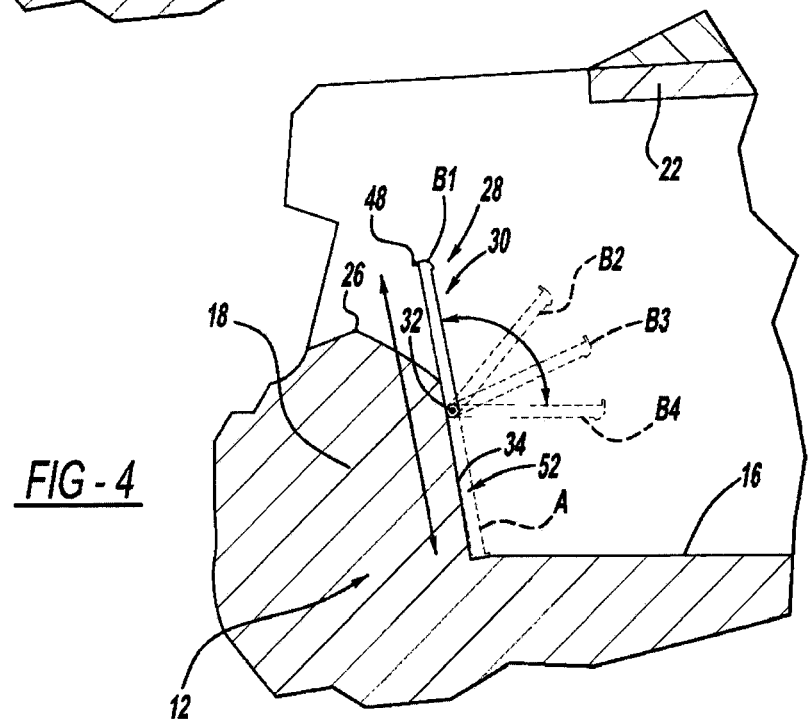
FIG. 4 is a side view of the retainer device according to additional teachings.

Referring now to FIG. 4, additional embodiments of the retainer device 28 will be discussed. As shown, the retainer device 28 can be substantially similar to the embodiments of FIGS. 1-3, except that the coupling member 32 can slideably and pivotally couple the retaining member 30 to the rear panel 18. For instance, to move from the stowed position (A) to the first deployed position (B1), the user can pull and slide the retaining member 30 upward and out of the recess 52. Then, the user can pivot the retaining member 30 downward between its other three deployed positions (B2, B3, B4). The coupling member 32 can include retainers (e.g., detent pins, etc.) to selectively maintain the retaining member 30 fixed in each of its deployed position. It will be appreciated, however, that the coupling member 32 could couple the retaining member 30 to the rear panel 18 in any suitable fashion.

As is also shown in FIG. 4, the hook 48 of the retaining member 30 can be turned to be substantially parallel with the roll axis of the vehicle 10. For instance, when in the deployed position (B1), the hook 48 can be turned rearward, and when in the deployed positions (B2, B3, B4), the hook 48 can be turned upward. These orientations of the hook 48 can facilitate hanging and retaining of the object 33 on the retaining member 30.

Figure 5:
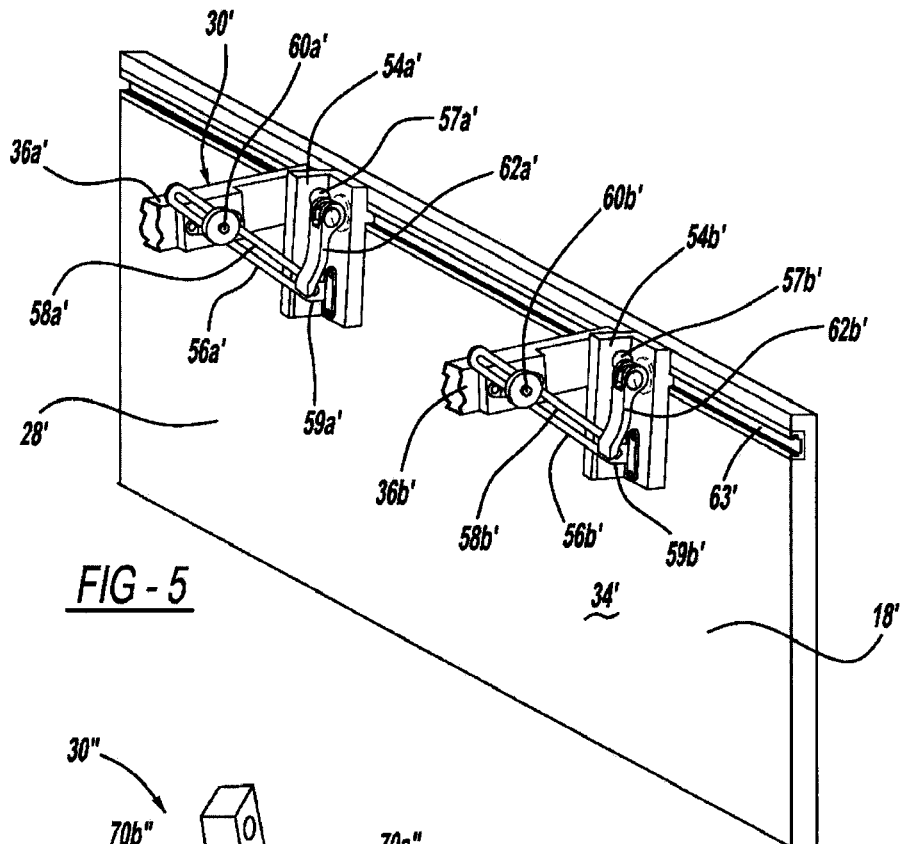
FIG. 5 is an interior, rearward perspective view of the retainer device according to additional teachings.

Referring now to FIG. 5, the retainer device 28' will be discussed according to additional exemplary embodiments. The coupling member 32' can include a plurality of brackets 54a', 54b' and sliders 56a', 56b'. Ends of the legs 36a', 36b' of the retaining member 30' can be pivotally attached to the brackets 54a', 54b' at pivot points 57a', 57b'. Also, the sliders 56a', 56b' can be pivotally attached to the brackets 54a', 54b' at pivot points 59a', 59b', and the sliders 56a', 56b' can include respective slots 58a', 58b' formed therein. Pins or other fasteners 60a', 60b' that are fixed to the legs 36a', 36b' can extend through and can slide within the slots 58a', 58b', respectively. Thus, to pivot the retaining member 30' between its stowed and deployed positions, the legs 36a', 36b' can pivot about points 57a', 57b', the sliders 56a', 56b' can pivot about points 59a', 59b', and the fasteners 60a', 60b' can slide within slots 58a', 58b'. In some embodiments, the slots 58a', 58b' can include notches (not shown) at select locations that extend transverse to the slots 58a', 58b', and the fasteners 60a', 60b' can come to rest within the notches to thereby retain the retaining member 30' in a deployed position.

Furthermore, the brackets 54a', 54b' can be slideably coupled to the rear panel 18' of the vehicle. For instance, the brackets 54a', 54b' can be slideably disposed within a channel 63' that extends in a cross-vehicle direction. Accordingly, the retaining member 30' can slide in a cross-vehicle direction for added convenience. Moreover, the brackets 54a', 54b' can additionally include slide locks 62a', 62b' that can selectively lock the brackets 54a', 54b' against sliding movement and selectively release the brackets 54a', 54b' for cross-vehicle movement. In some embodiments, the slide locks 62a', 62b' can include a small lever with an eccentric surface that can selectively push against the bracket 54a', 54b' to lock the bracket in place in the cross-vehicle direction, and the slide locks 62a', 62b' can be manually rotated to release pressure on the brackets 54a', 54b' for sliding movement.

Figure 6:
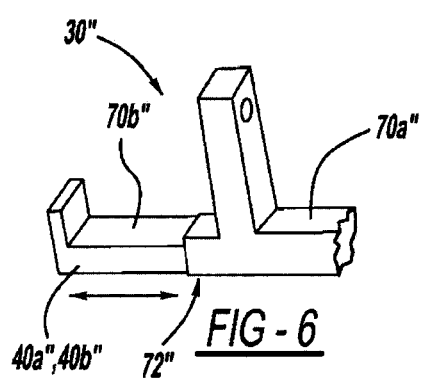
FIG. 6 is a perspective view of the retainer device according to additional embodiments.
Figure 7:
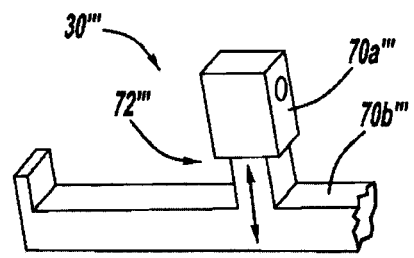
FIG. 7 is a perspective view of the retainer device according to additional embodiments.
Figure 8:
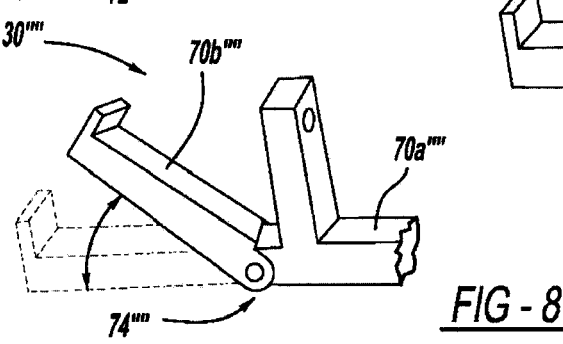
FIG. 8 is a perspective view of the retainer device according to additional embodiments.

Referring now to FIGS. 6-8, additional embodiments of the retaining member 30'', 30''', 30'''' will be discussed. As shown, the retaining member 30'', 30''', 30'''' can include a plurality of rigid portions 70a'', 70a''', 70a'''', 70b'', 70b''', 70b'''' that are moveably attached to each other.

For instance, in the embodiments of FIG. 6, the retaining member 30'' can include a telescoping section 72''. The portion 70b'' (an end of the branch 40a'', 40b'') telescopingly extends and retracts relative to the portion 70a'' to thereby change a width dimension of the retaining member 30''. Similarly, as shown in the telescoping section 72''' of FIG. 7, the portion 70b''' telescopingly extends and retracts relative to the portion 70a''' to thereby change a height dimension of the retaining member 30'''. Also, in the embodiments of FIG. 8, the portion 70b'''' is pivotally attached to the portion 70a'''' to expand and collapse the retaining member 30''''.

Thus, the retainer device 28 of the present disclosure provides a convenient and effective mean of carrying and retaining objects within a cargo area 14 of a vehicle 10. The retainer device 28 can be quickly and easily stowed and deployed in a number of different positions. The location of the retainer device 28 within the vehicle 10 also makes the retainer device 28 very accessible and useful.

What is claimed is:

1. A retainer device for retaining an object within a cargo area of a vehicle, the cargo area being defined at least partially by a cargo area floor, a rear panel that extends upright from the cargo area floor, and a plurality of side panels that extend upright from the cargo area floor and that are disposed at respective sides of the rear panel, the retainer device comprising:

a retaining member operable for retaining the object thereto, the retaining member including:
a first leg;
a second leg that is spaced apart from the first leg;
a cross bar that extends transverse between and that is fixed to the first and second legs;
a first branch that is coupled to the first leg and extends transverse to the first leg; and
a second branch that is coupled to the second leg and extends transverse to the second leg; and
a coupling member that slideably couples the retaining member to an interior surface of the rear panel such that the retaining member is slideably movable between a stowed position and a deployed position.

2. The retainer device of claim 1, wherein the coupling member pivotally attaches the retaining member to the interior surface of the rear panel to pivot between a first deployed position and a second deployed position.

3. The retainer device of claim 2, wherein the retaining member pivots upward and away from the cargo area floor when pivoting from the second deployed position to the first deployed position.

4. The retainer device of claim 2, wherein the retaining member is slideably moveable between the stowed position and the first deployed position, and pivotably movable between the first deployed position and a second deployed position, the retaining member being substantially fixed relative to the rear panel in each of the stowed position, the first deployed position, and the second deployed position.

5. The retainer device of claim 4, wherein the retaining member is moveable in a cross-vehicle direction to move between the first deployed position and the second deployed position.

6. The retainer device of claim 1, wherein the first and second branches include portions that are configured to telescopingly move to change a dimension of the retaining member.

7. The retainer device of claim 1, wherein the first and second branches are operable for hanging the object therefrom.

8. The retainer device of claim 7, wherein the first and second branches each include a hook that retains the object hanging on the retaining portion.

9. The retainer device of claim 7, wherein the first and second branches each include a raised area that limits movement of the object.

10. The retainer device of claim 1, wherein the retaining member is rigid.

11. The retainer device of claim 1, wherein each of the first and second branches includes a midsection, wherein the first leg is fixed to the midsection of the first branch, and wherein the second leg is fixed to the midsection of the second branch.

12. The retainer device of claim 11, wherein at least one of the first and second branches includes a first end and a second end, wherein the first end includes a first hook and the second end includes a second hook, the first and second hooks retaining the object on the at least one of the first and second branches.

13. The retainer device of claim 12, wherein the at least one of the first and second branches includes a raised area disposed between the first end and the second end, the raised area operable for limiting movement of the object along the at least one of the first and second branches.

14. The retainer device of claim 1, wherein the rear panel includes an upper lip that at least partially defines a cargo opening, the cargo opening providing access to the cargo area, the retaining member projecting above the upper lip and projecting forward of the upper lip when in the deployed position.

15. A vehicle comprising:
- a vehicle body having a cargo area, the body including a cargo area floor, a rear panel that extends upright from the cargo area floor, and a plurality of side panels that extend upright from the cargo area floor and that are disposed at respective sides of the rear panel, the cargo area floor, the rear panel, and the plurality of side panels collectively defining the cargo area at least partially; and
- a retainer device that includes a retaining member and a coupling member, the coupling member moveably coupling the retaining member to an interior surface of the rear panel, the retaining member moveable between a stowed position and a deployed position, the retaining member operable for retaining an object thereto,
- wherein the retaining member includes:
  - a first leg;
  - a second leg that is spaced apart from the first leg;
  - a cross bar that extends transverse between and that is fixed to the first and second legs;
  - a first branch that is coupled to the first leg and extends transverse to the first leg; and
- a second branch that is coupled to the second leg and extends transverse to the second leg; and
- wherein the rear panel includes a recess having a shape that corresponds to the retaining member, the retaining member operable to be received within the recess when in the stowed position.

\* \* \* \* \*